Nov. 12, 1935.    W. C. JACKSON    2,021,115
JOINT AND JOINTED ARTICLE
Filed Feb. 4, 1933
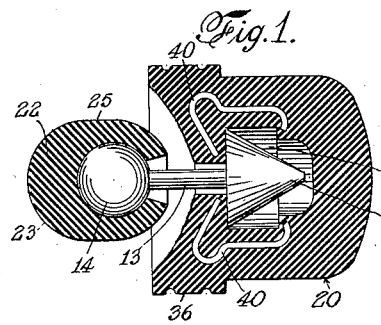
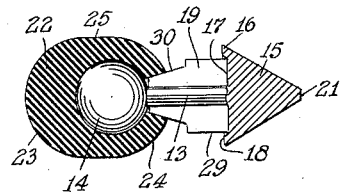
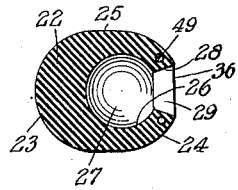
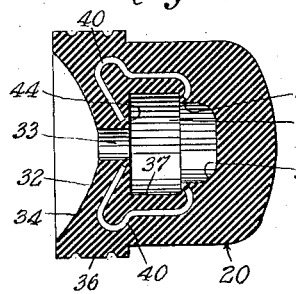
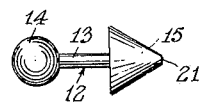
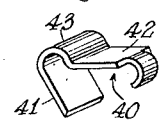
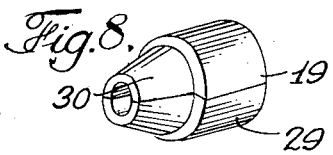
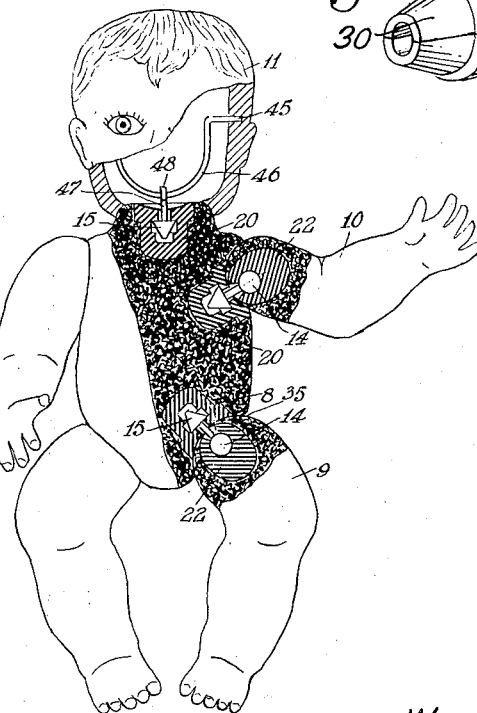
INVENTOR
WALTER C. JACKSON
BY
ATTORNEY Patented Nov. 12, 1935

2,021,115

UNITED STATES PATENT OFFICE 2,021,115

JOINT AND JOINTED ARTICLE

Walter C. Jackson, Rahway, N. J., assignor to Tingley-Reliance Rubber Corporation, Rahway, N. J., a corporation of New Jersey Application February 4, 1933, Serial No. 655,191

10 Claims. (Cl. 46—159)

This invention relates to devices for articulating structural parts and is primarily designed for articulating the limbs and head of dolls to the body, one of the objects of the invention being to provide means for articulating the arms and legs of a doll to the body portion in such a manner that these limbs are capable of movements approximating human movements.

Another object of the invention is to provide a device for jointing the arms and legs to hollow bodies in such a manner that they may move freely, the device being adapted to afford an air-tight and water-tight seal for the interior of the limbs and body.

Another object of the invention is to provide a device for articulating the limbs and head to a rubber doll, there being portions formed of vulcanizable rubber capable of being embedded in the various members and in the body of a vulcanizable rubber doll whereby the sockets may be vulcanized in position.

Another object of the invention is to furnish a toy formed of sponge rubber and having a body portion and limbs articulated to it in such a manner that the skin covering each of these members is entire and is vulcanized to the socket member of a ball and socket link connection.

A further object being to form the socket member as a cavity closed inwardly for sealing the mass of sponge rubber carrying the member.

As a further carrying forward of this idea, another object of the invention is to provide rubber sockets for a ball and socket link which may be vulcanized and become integrally associated with the body and members of a doll formed of sponge rubber, the skin of the sponge rubber uniting with the sockets in such a manner that an air-proof and water-proof covering is afforded for the body and for each of the members.

Another object of the invention is to provide a link for the ball and socket joint having a ball at one end and a cone at the other, the socket for the ball being molded about it and being adapted to be vulcanized in the upper ends of the limbs, the socket for the cone being adapted to be vulcanized in the body and after the independent vulcanization of the body and its appropriate members, the cones carried by the limbs are adapted to be forced into the sockets vulcanized in the body.

One of the principal objects of my invention is to afford a vulcanized sponge rubber doll having means for articulating the head, arms and legs to the body in such a manner as to approximate natural movements of these parts, the socket members for the connecting link being vulcanized integrally with the body and with the skin of the sponge rubber.

Some of the incidental objects and refinements are covered later in this specification.

The drawing accompanying this specification shows one practicable embodiment of my invention in which drawing;

Figure 1 is an assembly of the articulating device shown in longitudinal section.

Fig. 2 is partly a longitudinal section showing the molded socket member for the ball end of the connecting link in position on such ball and also a flask in position on the stem or bar portion of the link, such flask being for the purpose of assuring space for a limited amount of oscillation of the ball and of the link within the socket.

Fig. 3 is a longitudinal view of the detached socket member for the ball member.

Fig. 4 is a similar view of the socket member for the cone member.

Fig. 5 is a detached elevation of the link showing this in approximately the normal size suitable for an ordinary rubber doll.

Fig. 6 is a front elevation of a baby doll, partly shown in section revealing sponge rubber construction of the body, arms and legs, the head being represented as hollow and my improved articulating device shown in position.

Fig. 7 is a detail of a form of spring used in one of the socket members, and

Fig. 8 is a detail of the flask member illustrated in Fig. 2.

A baby doll made in accordance with my invention is illustrated in Fig. 6, and comprises a sponge rubber body portion 8, to which are articulated by means of my improved joints or articulating devices, members comprising legs 9, arms 10 and head 11.

Before proceeding to describe the doll structure, I shall describe the articulating device which is in the form of a link designated in a general way by the reference character 12 which is shown by itself in elevation in Fig. 5. This figure is drawn on a smaller scale than are the assembled and partly assembled views of Figures 1, 2, 3 and 4, but is on a larger scale than is the showing in Fig. 6.

The link 12 of the articulating device comprises a bar 13 carrying rigidly at one end a ball or substantially spherical member 14 and at the other end carrying a member 15, preferably conical in shape and having its base 16 facing toward the ball 14. This base is preferably formed with a depression 17 so that the cone has a raised edge 18. Both these aspects of the face are mentioned as separate items because the raised edge serves to hold the cone securely in its socket 20, presently to be described, and the depression serves to center and hold in position the flask members 19 which will also be referred to later. The end of the penetrating or cone member 15 is preferably blunted as by being truncated—21 in the illustration.

The socket member, 22, for the ball 14 is formed of rubber, molded about the ball 14 and then vulcanized. In the forms shown the socket member 22 has rounded ends 23 and 24 and a substantially cylindrical center portion 25. The entire link member is made of some material suitable to withstand the use and abuse to which it will be placed and also which will withstand the heat and pressure of vulcanization and also the chemical ingredients of the rubber compound and also one that will withstand the corrosive action of the atmosphere and of water, particularly sea water because sponge rubber dolls are frequently taken into the ocean bathing with their owners. They are also bathed with soap and water and it is impossible to dry any or all of these moistures out of the sockets. Of course, when the socket is tightly fitted and new very little if any moisture will find access, but use and abuse open up crevices for the entrance of these deteriorating elements in sockets heretofore in use. I have found that among other materials some iron alloys afford suitable material for the parts of this link. As the compound of the rubber will normally not adhere to the surface of the ball it is only necessary to clean the ball before molding the rubber about it. In other cases according to the compound of the rubber and the material of the ball it may be necessary to coat or otherwise treat the ball immediately prior to the application of the rubber about it.

To permit the ball to oscillate about its center but in a limited manner, it is desirable to make the opening thru which the bar member 13 passes of a slightly larger diameter than the diameter of such bar and so as to permit this movement with the least amount of loss to the inner wall 26 of the cavity 27 of the socket member 22, the side wall 28 of this opening 29 is preferably formed as a cone with its apex at the center of the ball 14.

For the purpose of readily forming this side wall 28 as above described the flask 19, see Figs. 2 and 8, is made of longitudinally separable members and is mounted on the bar 13 prior to the molding of the socket member 22 about the ball 14. The body portion 29 of the flask fits into the depression 17 and within the raised rim 18 of the base of the cone 15. The end of the flask which engages the ball is formed as a cone 30 of the proper angle for giving the suitable formation to the side faces 28.

The portion of the device which is above described, namely the socket member 22 molded of vulcanizable rubber upon the link member with the flask 19 in position, may constitute an article of manufacture and an article of commerce ready for delivery from its maker to the manufacturer of dolls. In many cases in which the device is intended for articulating the members to a body which will be vulcanized, this part will be furnished to such doll manufacturers in a raw state. For certain purposes of manufacturing the rubber doll bodies and also if the device is intended for insertion into a body formed of some other material than rubber, such as plaster, it may be found desirable to first vulcanize the socket member 22 before this is applied to such body. In this latter case the vulcanizing may most conveniently be done by the maker of the socket member before delivery to the doll manufacturer.

The part of the device which is described is preferably intended for application to the members which will be articulated to a body portion as for instance the arms, legs and head of a doll. The part which is primarily designed for insertion in the body portion is the socket member for the cone designated by 20 and shown in detail in several views and also by itself in Fig. 4. The cone socket member 20 is designed to be formed of vulcanizable rubber and will either be delivered to the doll manufacturer in the raw state or vulcanized according to the conditions discussed in connection with the ball socket member 22. This socket member 20 is rather more bulky than is the ball socket member. It being intended for location within the body portion represented by 8 in Fig. 6, it has to withstand more severe treatment than does the ball socket member 22, and also because it has been found desirable to employ a cone having a base of considerably larger diameter than is the diameter of the ball 14. This socket member 20 has a cavity 31 for loosely fitting the cone and a diaphragm member 32 having a centrally disposed substantially cylindrical perforation 33. The diaphragm preferably has a depression 34 for receiving the conoidal end 35 of the articulated member as for instance the limb 9 of Fig. 6. This central depression is shown of conical formation for guiding the cone member 15 into the perforation 33 of the diaphragm. The purpose of blunting the end of the penetrating member, that is truncating at 21 the cone 15, is so that should one of the members become detached from the boy as from pulling the cone out of its socket and an attempt made by an unskilled person to reinsert the cone at the wrong place this insertion will be resisted. The cavity face 44 of the diaphragm 32 preferably occupies a flat plane.

The bar 13 of the link member 12 should be made of material sufficiently strong to resist the various strains to which it will be put when in use and sufficiently rigid that it will not bend materially when the cone is being forced into the cavity 31.

The outer portion of the socket member 20, as at 36, will preferably be formed for application to a body member. Assuming that a socket 20 has been secured in a body, as for instance the body 8 of a sponge rubber doll by suitable vulcanization or curing, and that a socket member 22 carrying the link member has been vulcanized in another part, as for instance the leg 9 of a sponge rubber doll and the flask 19 removed, and it is desired to assemble these parts; the operator takes the limb 9 in one hand and the body 8 in the other and presents the penetrating member, the cone 15, to the orifice 33 of the diaphragm 32 and by the application of suitable pressure, forces this penetrating head into the cavity, causing the diaphragm to yield away from it. Immediately upon the base 16 of of the penetrating head or cone passing the rear face 44 of the diaphragm the elasticity of the diaphragm causes it to assume its original or normal position and lock the head 15 against removal.

It will be noted that the space between the rear face 16 of this conical head 15 and the front face 36 of the socket 22 is greater than the length of the cylindrical orifice 33 in the diaphragm. This is for the purpose of giving an amount of movement of the parts in a direction longitudinally of the bar 13. The cavity 31 is formed with a substantially cylindrical part 37 which is only slightly greater in diameter than is the diameter of the base 16 of the conical head 15 and is of a sufficient depth to permit the incidental in and out movement of the conical head 15 in the cavity. The inner end of the cavity 31 is cup shape, 38, which is of considerably less diameter at its forward end than is the cylindrical portion 37 whereby a restricted and abrupt shoulder 39 is formed which engages the sides of the cone 15 for limiting the oscillation of the bar 13 in the diaphragm orifice 33 particularly when the parts are pressed inwardly and the base 16 is in such a position that its edges do not engage the rear face 44 of the diaphragm. It will be noted that the diameter of the cylindrical orifice 33 is considerably greater than the diameter of the bar 13 of the link member.

A direct pull on the limb, or even a pull at an angle, draws edge 18 of the base of the cone up against the rear face 44 of the diaphragm making withdrawal of this part very difficult. If, however, the head 15 should be forced out of the socket 31 past the diaphragm 32 its insertion can be quite easily effected even by one not particularly skilled in this assembly.

For the purpose of making the disassembly even more difficult, reinforcing springs 40, see Fig. 7, may be molded in the socket member 20 and have ends 41 slanting in approximately the angle of the cavity 34. The portion between these ends 41 and the body portions 42 of the springs may be bowed as at 43 which will add to the yieldability in the penetrating direction but add rigidity against the withdrawal movement.

This articulating device is peculiarly adapted for connecting the arms and legs of dolls to the bodies because it very nearly approximates in its function and operating the human shoulder joint and the human hip joint.

As an added reinforcement to the molded rubber socket member 22, should a larger opening be desired at 28 and 29 to give a wider oscillating motion to the link, a metal ring 49 may be molded in the socket member for the purpose of resisting dislocation of the ball 14 from its socket cavity. This ring is preferably molded in the rubber, and when vulcanized in place prevents the removal of the ball from the socket. The presence of this ring permits a wider opening and a greater range of oscillation of the bar 12.

When material other than sponge rubber is used for the heads of dolls, they are usually formed hollow. In such instances the link for articulating the head to the body differs from the links which are used for articulating the legs and arms to the extent that in place of the ball and socket joint a hook or eye 48 is provided in the headward end of the bar 47 which engages a trapeze 46 having its ends 45 bent outwardly and seated in cavities formed in the side walls of the head member. The head in this instance is preferably mounted in the following manner. The cone 15 of the link is forced into the socket member 20, then the trapeze is connected with the eye 48 and this trapeze is entered through the neck opening and is permitted to spring outwardly seating the pivot ends 45 in the sockets in the head wall.

Another mode of mounting the head may also be followed particularly when the head is received from its manufacturer having the trapeze 46 located in place. The eye 48, of the bar 47, is then bent or sprung around the trapeze 46. The cone 15 is placed over the entrance of the socket in the neck as the head is brought into its regular position on the body and by pressing down on the head the cone 15 is centered by the conoidal depression 35 and is brought to the orifice 33 whereupon additional pressure enters the cone 15 into the cavity of the socket member.

Altho but one embodiment of my invention has been illustrated yet it will be apparent that changes may be made within the scope of the claims without departing from the spirit of my invention.

Having thus described my invention I claim and desire to secure by Letters Patent:

1. A vulcanized rubber doll having a body, arms and legs in combination with a device for articulating each of these limbs to the body and comprising a link in the form of a bar having a ball formed at one end and a cone formed at the other end, the base of the cone facing the ball, a socket member for the ball formed of rubber vulcanized about the ball within the limb, a socket member for the cone formed of rubber vulcanized within the body and having a cavity for the cone closed by a centrally perforated diaphragm, the cone being seated in such socket cavity and the bar located in the diaphragm perforation.

2. As an article of manufacture, a link for articulating structural parts and comprising a bar having a ball formed at one end and a cone formed at the other end, the base of the cone facing toward the ball and a socket member for the ball formed of plastic material molded about the ball.

3. As an article of manufacture, a link for articulated structural parts and comprising a bar having a ball formed at one end and a cone formed at the other end, the base of the cone facing toward the ball, such base having a raised edge.

4. As an article of manufacture, a link for articulating structural parts and comprising a bar having a ball formed at one end and a cone formed at the other end, the base of the cone facing toward the ball, a socket for the ball formed of rubber molded about the ball and a socket for the cone formed of rubber having a cavity for loosely fitting the cone and a centrally perforated diaphragm closing such cavity, spring dogs located in the body of the socket and extending into the diaphragm, such diaphragm being adapted upon the application of suitable force to permit the ready penetration of the cone through such perforation and to close about the bar and over the base of the cone for preventing its withdrawal.

5. As an article of manufacture, a link for articulating structural parts and comprising a bar having a cone formed at the one end, the base of the cone facing toward the bar, and a socket for the cone formed of rubber having a cavity for loosely fitting the cone and a centrally perforated diaphragm closing such cavity and adapted upon the application of suitable force to permit the ready penetration of the cone through such perforation and to close about the bar and over the base of the cone for preventing its withdrawal, the cavity of the socket inwardly of the diaphragm being formed with a substantially cylindrical part slightly greater in diameter than is the diameter of the base of the cone and the thickness of the diaphragm at the perforation being less than the length of the bar for permitting a limited free longitudinal movement of the bar toward and from the socket for the cone.

6. As an article of manufacture, a link for articulating structural parts and comprising a bar having a ball formed at one end and a cone formed at the other end, the base of the cone facing toward the ball, a socket for the ball formed of rubber molded about the ball and a socket for the cone formed of rubber having a cavity for loosely fitting the cone and a centrally perforated diaphragm closing such cavity, there being spring dogs located in the walls of the socket and having spring fingers extending into the diaphragm, the organization being such that upon the application of suitable force it will permit the ready penetration of the cone through such perforation and permit the latter to close about the bar and over the base of the cone thereby preventing its withdrawal.

7. As an article of manufacture a link for articulating structural parts and comprisini a bar having a ball formed at one end and an enlargement at the other end, a socket for the ball formed of rubber molded about the ball and a removable spacer member surrounding the bar and having a portion located about the bar within the socket adjacent the ball for giving a formation to the wall of the socket whereby after the socket is cured the bar and ball may have a limited free oscillation.

8. A doll body composed of sponge rubber and formed with an enveloping skin, socket members having closed cavities molded within the body, the skin of the body being united to the socket members.

9. A doll body composed of sponge rubber and formed with an enveloping skin, socket members having closed cavities molded within the body, the skin of the body being united to the socket members, and limbs composed of sponge rubber and formed with enveloping skins, and articulating members carried by the limbs for engaging the socket members located within the body.

10. A vulcanized rubber doll comprising a sponge rubber body having sponge rubber limbs in combination with a device for articulating each of these limbs to the body and comprising a link in the form of a bar extending outwardly from the limb and formed at the outward end with a cone, the base of the cone facing the limb and sockets for the cones formed of vulcanized rubber located within the body and each having a cavity for a cone covered by a centrally perforated diaphragm, the cone being seated in such cavity and the bar being located in the diaphragm perforation, the thickness of the diaphragm in the perforation being somewhat less than is the length of the bar whereby to limit the movement within the socket, the wall of the socket being substantially cylindrical throughout the region of traverse of the base of the cone, such cylindrical portion ending in a reduced cup shape portion forming a restricted and abrupt shoulder for engaging the sides of the cones for limiting the oscillation of the bar in the diaphragm perforation.

WALTER C. JACKSON.